United States Patent Office 2,819,305
Patented Jan. 7, 1958

2,819,305

AMINOALKYLAMIDES OF BUTOXYBENZOIC ACID

William A. Lott, Maplewood, N. J., assignor to Olin Mathieson Chemical Corporation, New York, N. Y., a corporation of Virginia No Drawing. Application September 28, 1956
Serial No. 612,882

3 Claims. (Cl. 260—559)

This invention relates to new N-(lower alkyl)-N-substituted amino(lower alkyl)-4-(butoxy)benzamides, which are of value as topical anesthetics, and their method of preparation.

The new compounds of this invention may be represented by the following formula:

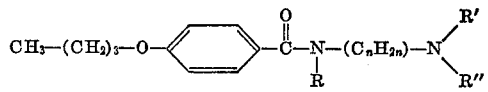

wherein R is a lower alkyl (preferably lower alkyl of 1 to 4 carbon atoms, and especially methyl), $n$ is a positive integer of 2 through 6, and R' and R" are each lower alkyl or together with the N to which they are joined form a saturated heterocyclic radical. The new compounds may be obtained as, or converted into, free bases or acid-additions salts.

The compounds of this invention are useful as topical anesthetics, and may be used for this purpose in the form of an ointment, lotion or as a spray. The compounds of this invention are far superior to their N-unsubstituted analogues, the former being more potent, less irritating, and/or having more rapid onset of action.

The new compounds are readily prepared by reacting the desired 4-(butoxy)benzoyl halide, preferably the chloride, with a diamine of the formula:

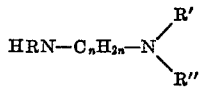

R, R' and R" having the meaning given hereinbefore, and recovering the amide thus formed. This reaction is preferably conducted by heating the reactants, optimally at reflux temperature, in an organic solvent, such as hydrocarbon (e. g. benzene or toluene) or a halogenated hydrocarbon (e. g. chloroform). The halide utilizable as the starting material in the process of this invention is preferably 4-n-butoxybenzoyl chloride. Among the diamines utilizable in the process of this invention may be mentioned the following: N,N-di(lower alkyl)-N'-(lower alkyl)-(lower alkylene)-diamines [e. g. N,N,N'-trimethylethylenediamine; N,N-diethyl-N'-methyl-ethylenediamine; N,N-dipropyl-N'-methyl-ethylenediamine; N,N,N'-triethylethylenediamine; N,N-diethyl-N'-methyl-1,3-propylenediamine; and N,N,N'-trimethyl-1,4-butylenediamine]; the N-[piperidino(lower alkyl)]-N-(lower alkyl) amines [e. g. N-piperidinoethyl-N-methylamine]; the N-[(lower alkyl)piperidino(lower alkyl)]-N-(lower alkyl)amines [e. g. N-4-pipercolinoethyl-N-methylamine]; the N-[pyrrolidino(lower alkyl)]-N-(lower alkyl)amines [e. g. N-pyrrolidinoethyl-N-methylamine]; and the N-[(lower alkyl)pyrrolidino(lower alkyl)]-N-(lower alkyl) amines [e. g. 3-methylpyrrollidinoethyl-N-methylamine].

When the process is carried out as hereinbefore detailed, the hydrohalide (e. g. hydrochloride) salts of the amides are initially formed. However, salts with other acids forming addition salts with amines may be prepared by converting the hydrohalide salt to the free base, by treatment with a basic reagent such as potassium carbonate, and subsequent reaction of the free base with the desired acid (e. g. with nitric, phosphoric, sulfuric, boric, lactic, tartaric, citric, or picric acid, a pharmacologically-acceptable acid being employed where the salt is to be the final compound).

The following examples are illustrative of the invention:

EXAMPLE 1

*N-(2-diethylaminoethyl)-N-methyl-4-n-butoxybenzamide hydrochloride*

A solution of 21.9 g. of N,N-diethyl-N'-methylethylene-diamine [J. Chem. Soc. 1421 (1935)] in 150 ml. of benzene is added dropwise to a solution of 35.6 g. of p-butoxybenzoyl chloride in 300 ml. of benzene while maintaining the temperature at 25–30° C. The mixture is stirred at room temperature for thirty minutes and then refluxed for two hours. After cooling, the mixture is extracted with 100 ml. of water. The aqueous phase is separated and treated with a solution of 8 g. of sodium hydroxide in 50 ml. of water. The liberated base is extracted with ether and dried over magnesium sulfate. After evaporation of the ether, the residue is distilled to give about 42 g. of pure base; B. P. about 175–177° C. (0.5 mm.). This material is converted to the hydrochloride salt by dissolving in 100 ml. of ether and then adding one equivalent of hydrogen chloride in 50 ml. of absolute alcohol. The resulting solution is diluted with ether to incipient turbidity and then cooled. The crystalline hygroscopic product weighs about 39.0 g.; M. P. approximately 85.5–87° C. After crystallization from a mixture of 100 ml. of benzene and 300 ml. of hexane, the pure product melts at about 86–88° C.

EXAMPLE 2

*N-(2-diethylaminoethyl)-N-ethyl-4-butoxybenzamide hydrochloride*

Replacement of N,N-diethyl-N'-methylethylenediamine in Example 1 by 24.2 g. of N,N,N'-triethylethylenediamine [J. Chem. Soc., 1421 (1935)] gives the corresponding N-ethyl compound which is then converted to the crystalline hydrochloride salt in the usual manner.

EXAMPLE 3

*N-(2-piperidinoethyl)-N-methyl-4-butoxybenzamide hydrochloride*

Replacement of N,N-diethyl-N-methylethylenediamine in Example 1 by 24.1 g. of 2-piperidinoethylmethylamine gives the corresponding piperidino base which is then converted to the crystalline hydrochloride salt in the usual manner.

The invention may be otherwise variously embodied within the scope of the appended claims.

I claim:

1. A compound selected from the group consisting of free bases of the general formula

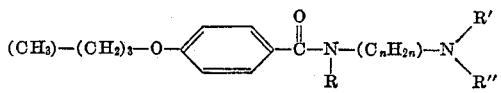

wherein R is lower alkyl, $n$ is a positive integer from 2 through 6, and R' and R" are each lower alkyl; and the addition salts thereof with pharmacologically-acceptable acids.

2. N-(2- diethylaminoethyl)- N- methyl- 4- butoxybenzamide hydrochloride.

3. N-(2-diethylaminoethyl)-N-ethyl-4-butoxybenzamide hydrochloride.

References Cited in the file of this patent
UNITED STATES PATENTS

| | | |
|---|---|---|
| 2,654,758 | Papa et al. | Oct. 6, 1953 |
| 2,670,373 | Cusic | Feb. 23, 1954 |
| 2,698,327 | Cusic | Dec. 28, 1954 |

OTHER REFERENCES

McIntyre et al.: "Nebraska State Med. J.," vol. 35 (1950), pp. 100–105.